C. COLLINS.
Wagon-Seat Fastener.
No. 97,883.   Patented Dec. 14, 1869.
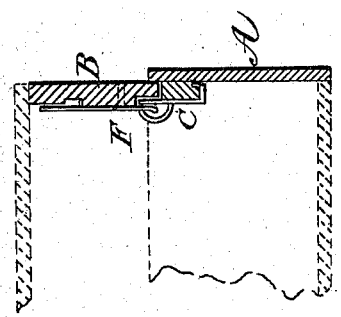
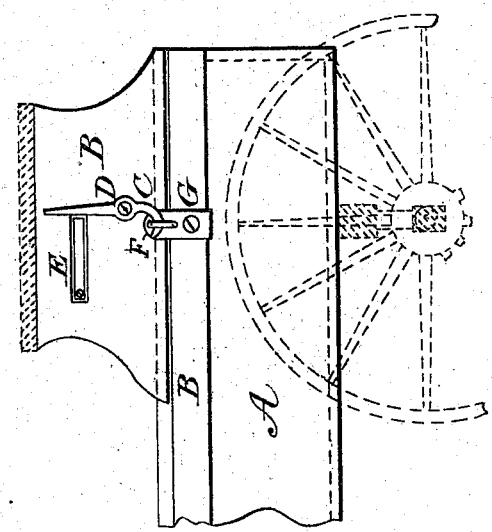
Witnesses:
Inventor:

United States Patent Office.

CHARLES COLLINS, OF VERNON CENTRE, NEW YORK.

Letters Patent No. 97,883, dated December 14, 1869.

IMPROVEMENT IN WAGON-SEAT FASTENING.

The Schedule referred to in these Letters Patent and making part of the same.

*To all whom it may concern:*

Be it known that I, CHARLES COLLINS, of Vernon Centre, in the county of Oneida, and State of New York, have invented a new and improved Wagon-Seat Fastener; and I do hereby declare that the following is a full, clear, and exact description thereof, which will enable others skilled in the art to make and use the same, reference being had to the accompanying drawings, forming part of this specification.

This invention relates to improvements in means for holding detachable wagon or sleigh-seats to the boxes, and consists in the application, to the seat-risers, of hooks, with spring-stops, adapted for engaging staples in the boxes below the said hooks, and for being held in such engagement, by the spring-stops, until disengaged by the operator, for removing the seats.

Figure 1 represents a longitudinal sectional elevation of a part of a wagon, showing my improvement, and Figure 2 represents a transverse section of one side of the box and seat.

Similar letters of reference indicate corresponding parts.

A represents the side of a rectangular wagon-box, and B, the rail, commonly secured to the side, a little below the upper edge, for stiffening the same, and for supporting the risers C of the seats, which are connected, at each end, to a riser at the top thereof, and extend across the box.

C is the hook, pivoted to the riser, and provided with a long shank, D.

E is a spring-stop, fastened, at one end, in a recess in the inside of the riser, and arranged so that the free end will spring out in front of the shank D of the hook, when the latter is engaged with the staple F, connected to a plate, G, attached to the bar B.

For disengaging the hook, the spring E is pressed into the recess in the riser, by the hand, previous to swinging the hook around on its pivot for the said disengagement.

This arrangement provides a cheap, simple, and secure fastening for the seat, not liable to be disengaged by the jarring of the wagon.

The hook may be placed on the bar B, and the staple on the riser, if preferred; but I prefer the arrangement herein shown.

Having thus described my invention,

I claim as new, and desire to secure by Letters Patent—

1. The detent E, arranged on a wagon-seat, and operating in the manner described.

2. The combination of the detent E with a hooked lever, D, and eye F, each constructed as and for the purpose specified.

CHARLES COLLINS.

Witnesses:
    J. L. FOOTE,
    W. D. TORREY.